UNITED STATES PATENT OFFICE 1,933,950

METHOD OF SHELLFISH CULTURE

William Firth Wells, Cambridge, Mass.

No Drawing. Application February 20, 1922, Serial No. 538,138. Renewed November 14, 1931

6 Claims. (Cl. 119—4)

The invention relates to shell-fish culture and more specifically to the artificial culture of oysters, although the improvements are applicable to the development of other shell-fish such as clams, scallops, etc.

As long ago as 1879 it was demonstrated that spawn could be taken from the female oyster, fertilized in much the same manner as are the eggs of fish in hatcheries, and that the young oysters could be kept alive until they had absorbed their yolk,—a period of about six days. Since that time other scientists have worked at the problem, but so far as I am aware no material advance has been made in the artificial propagation and culture of the shell-fish. None of the investigators has been able to carry the young oyster beyond the stage when it has used up the food material bequeathed by the mother and seeks to secure its own food. In other words, no means has formerly been devised for feeding the young shell-fish.

The main cause of this failure is the microscopic size of the shell-fish which, at the time it starts to seek food, is so infinitesimal that it would require about four hundred of them to reach one inch. Previous investigators have admitted that they could proceed no farther because they had no practicable method of changing the water, and thus supplying fresh food, without losing their minute charges.

The time of development of an oyster, for example, from spawning to setting is approximately one month. In other words there is a period of about one month between the spawning and the time when the embryonic oyster sinks to the bottom and attaches itself to a shell or other hard object, during which period it is a free-swimmer. Once "set", the experienced oysterman is perfectly familiar with methods of handling the oysters to raise them for the market. The obstacle in their artificial culture therefore has occurred in carrying them through the period of free-swimming.

As previously indicated the chief cause of failure over this period is the inability to change the water, and thereby keep the oysters supplied with the necessary food, without loss of the spat. In any successful method of accomplishing this change, the food values must be retained while the bodies which are inimical to the development of the shell-fish must be eliminated. The enemy bodies are not the less dangerous because they too are small. Previous attempts have failed because they do not fulfill the foregoing requirements.

Experiments extending over a considerable period of time have demonstrated that the technical difficulties described are not only not insuperable, but that a very simple though unobvious manner of separation is quite suitable for effecting the desirable results so long sought. I have discovered that if water containing the seed or tiny oysters is strained under suitable conditions or is subjected to centrifugal action, as in the ordinary milk clarifier, the seed are readily separated and may be transferred to another volume of water containing fresh food and other necessities for life. The same method is suitable for the preliminary treatment of the culture water to eliminate any dirt and various enemies of the oysters. In part my invention therefore comprises the novel separation of the seed in a satisfactory manner and the preliminary treatment of the replenishing water in such manner that the desired substances are retained while the inimical bodies are eliminated.

It naturally would be supposed that such delicate animals would be injured by passage through a centrifugal machine, but comparative tests have shown that this is not the case. The enclosing shells, although quite fragile, are sufficiently protective and the forms can be concentrated in the machine without injury.

In order that the full scope of my improvements may be grasped, I shall give a brief synopsis of the plan of shell-fish culture embodying my novel steps. The system of culture is conveniently divided into two main heads:

(1) Artificial propagation of the shell-fish;
(2) Collection of the "set".

Under head (1) there falls the fertilization of the spawn and the care and treatment of the seed (young oysters) during the period of free-swimming, while (2) embraces the period of attachment and the recovery from the collectors. A more elaborate tabulation showing the relation of the various steps is as follows:

1. *Artificial propagation of the shell-fish*

(a) Fertilization of the eggs.
(b) Preparation of the water.
(c) Culture of fertilized eggs in prepared water.
(d) Recovery of larvæ (from prepared water).
(e) Continued culture of larvæ or seed to setting stage.

2. *Collection of the "set"*

(a) Attachment to artificial collectors.

(b) Growth on the collectors.

(c) Separation from the collectors.

As previously stated the fertilization of the eggs (1(a)) is a well understood step and may be accomplished by long-established methods.

With reference to article 1(b), the object of preparing the water is, as previously indicated, to eliminate from the natural sea-water, which contains the substances necessary to the life of the seed, such organisms and matter as would interfere with the culture of the eggs and larvæ or with the subsequent recovery thereof, without removing the substances necessary to their life and culture. These interfering organisms and matter comprise such gross suspended bodies as would by their reactions foul the culture basin or render the recovery difficult by their physical and chemical interference, and also such organisms as commonly occur in the natural waters which are enemies of the larvæ in that they attack the same directly or compete for the substances necessary to the larvæ,—generally described under the biological groups of Algæ, Protozoa, Crustacea, etc., collectively known as plankton.

I have discovered that the substances necessary to the larval development of the shell-fish are in general either in true solution or are so finely divided as to be smaller than the larvæ themselves and also smaller or finer than the interfering matters and organisms referred to, and that, according to circumstances, by passing the water through suitable screens or, preferably, through suitable centrifugal machines, the interfering matters and organisms may be retained and discarded while the necessary substances are permitted to pass through into the prepared culture water.

The development (1(c)) of the artificially fertilized eggs in the prepared culture water exhausts the resources and it is necessary to replace the water periodically or continuously with fresh portions which have received the preliminary treatment prescribed under 1(b).

The removal of the spent culture-water from the seed, for replenishing, embraces the recovery of the larvæ (1(d)). The screens or centrifugal machines which are suitable for preparing the culture water are also suitable for the larvæ recovery step, since the larvæ will be retained while the undesirable exhausted culture-water will pass through. The larvæ are retained, unharmed, in the bowl of the centrifugal or, according to circumstance, by the screens. It is possible therefore by this means to secure a transfer of the larvæ to new culture-water or to effect an exchange of the culture-water.

The terms "straining" or "screening" as herein employed are not to be confused with "filtering" as customarily used in the industry. Filtering, as generally understood, refers to an operation in which the separating medium is of such fine texture, or in which the interstices are so minute, that the finer as well as the larger bodies are separated from the liquid, resulting in a clear effluent. Obviously such an operation is unfit for the present purpose which requires a separation as between the larger bodies and the smaller bodies. Where screens are employed, the mesh selected will vary according to the size of the larvæ which will, in turn, depend somewhat on the stage of development. Immediately following fertilization, the larvæ may be so minute as to render screening somewhat difficult as an effective means of separation at this stage. Where this occurs the centrifuge may first be employed and followed during the later stages of growth with screening. In certain experiments, screens varying from about 200 mesh at the earlier stages of the development to about 100 mesh for the more developed forms were found suitable. With especially devised screens it will doubtless be possible in many cases to employ this means of separation exclusively. On the other hand it is obvious that the separations may be effected entirely by centrifuging.

Through repeated succession of steps 1(b), 1(c), and 1(d), the development of the larvæ may be continued (1(e)) to the setting stage.

When the larvæ reach the setting stage, artificial collectors are immersed in the tanks or basins and by controlling the time of immersion it is possible to regulate the intensity of the "set", that is, the number of spat which attach per square inch of surface. It is therefore possible to adapt a variety of artificial surfaces which would not be practical under natural conditions.

By regulating the intensity of the set, so that approximately ten to twenty spat attach per square inch of surface, growing oysters upon contact with one another turn the edges of the shells upward, forming what is called "corn on the cob" set. This type of set has very little area of attachment and is therefore easily scaled off, giving a very superior grade of "seed".

The present invention, it will be seen, fills in the gap between the previous studies of scientists and the practical knowledge of the oystermen. The importance of the invention will at once be obvious to those acquainted with the culture of oysters and with the impaired condition of the oyster-grounds, particularly in manufacturing localities along the coasts. The simple and practical character of the invention will also be apparent to those skilled in the art. By the method of culture described it will be possible to considerably increase the crop of oysters, either by stocking the beds with artificially secured set or by liberating at the proper time artificially developed young oysters which will make their own set in shell-planted waters.

I claim:—

1. In the artificial culture of shell-fish, the step which comprises removing bodies of a size substantially larger than that of the shell-fish by subjecting the culture-water to centrifuging before supplying the same to the shell-fish.

2. In the artificial culture of shell-fish, the step which comprises subjecting the culture-water, before supplying the same to the shell-fish seed, to a centrifuging action to separate therefrom bodies larger than the seed.

3. In the artificial culture of shell-fish, the steps which consist in subjecting spent culture water together with the shell-fish to centrifuging action to separate the former from the latter and subjecting fresh culture water to centrifuging action to separate therefrom bodies larger than the shell-fish.

4. In the artificial cultivation of shell-fish, the process which comprises introducing the larvæ into a confined and completely isolated body of culture water from which bodies inimical to the development of the larvæ have been removed, removing the larvæ in a mass from the culture water when the same has become deficient in developing value, and transferring the mass of larvæ to another confined and completely isolated body of culture water from which bodies inimical to the development of the larvæ have been removed.

5. In a batch process for the artificial cultivation of shell-fish, the steps which comprise preparing culture water from seawater, confining the culture water in a vessel, introducing larvæ into the vessel for development in said prepared culture water, separating the larvæ substantially completely and as a mass from the culture water when the latter becomes deficient in developing value, preparing a further batch of culture water, transferring the mass of larvæ to the further batch of culture water, and thereafter periodically separating the larvæ as a mass from the spent batch of culture water and transferring the same to other batches of prepared culture water.

6. A batch process for the artificial cultivation of shell-fish, which process comprises preparing culture water by removing from seawater bodies inimical to the development of the larvæ, confining a batch of the prepared culture water in a vessel, introducing the larvæ into the said vessel, removing the larvæ completely and as a mass from the culture water when the same has become deficient in developing value, confining a further batch of prepared culture water in a vessel, and transferring to said further batch of culture water the mass of larvæ removed from the first batch of culture water.

WILLIAM FIRTH WELLS.